US008390259B2

(12) United States Patent
Dommaschk et al.

(10) Patent No.: US 8,390,259 B2
(45) Date of Patent: Mar. 5, 2013

(54) DRIVING OF A PHASE MODULE BRANCH OF A MULTILEVEL CONVERTER

(75) Inventors: Mike Dommaschk, Guteborn (DE); Jörg Dorn, Buttenheim (DE); Ingo Euler, Erlangen (DE); Jörg Lang, Stadtsteinach (DE); Quoc-Buu Tu, Rosstal (DE); Klaus Würflinger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 663 days.

(21) Appl. No.: 12/523,461

(22) PCT Filed: Jan. 17, 2007

(86) PCT No.: PCT/DE2007/000099
§ 371 (c)(1),
(2), (4) Date: Jul. 16, 2009

(87) PCT Pub. No.: WO2008/086760
PCT Pub. Date: Jul. 24, 2008

(65) Prior Publication Data
US 2010/0060235 A1  Mar. 11, 2010

(51) Int. Cl.
*H02J 7/00* (2006.01)
(52) U.S. Cl. .............................. 320/166; 363/132
(58) Field of Classification Search .............. 320/166
See application file for complete search history.

(56) References Cited

U.S. PATENT DOCUMENTS

| 7,577,008 | B2 * | 8/2009 | Hiller ........................... 363/132 |
| 7,835,166 | B2 * | 11/2010 | Hiller ........................... 363/132 |
| 7,960,871 | B2 * | 6/2011 | Dommaschk et al. ........ 307/151 |
| 2006/0080012 | A1 | 4/2006 | Nishina et al. |
| 2008/0310205 | A1 * | 12/2008 | Hiller ........................... 363/131 |

FOREIGN PATENT DOCUMENTS
EP  1541407 A1  6/2005

OTHER PUBLICATIONS

A. Lesnicar, et al: "A New Modular Voltage Source Inverter Topology", Institute of Power Electronics and Control, XP-002454302, pp. 1-10, München, Germany.

* cited by examiner

*Primary Examiner* — Ramy Ramadan
(74) *Attorney, Agent, or Firm* — Laurence A. Greenberg; Werner H. Stemer; Ralph E. Locher

(57) ABSTRACT

A method for charging and/or discharging energy storage devices is performed in a multilevel converter including at least one phase module branch having a series circuit of submodules each with at least one power semiconductor circuit for connection or disconnection of an energy storage device in a circuit parallel to the power semiconductor circuit and a submodule sensor for detection of an energy storage actual value. An energy change state is obtained and a determination is made as to whether connected energy storage devices in a phase module branch can be charged or discharged. The next energy storage device to be switched in each phase module branch is selected by predetermined logic dependent on an energy change state, through which energy stored in energy storage devices is kept approximately at the same level. A high clock rate is simultaneously avoided for connection and disconnection of the selected energy storage device.

7 Claims, 3 Drawing Sheets

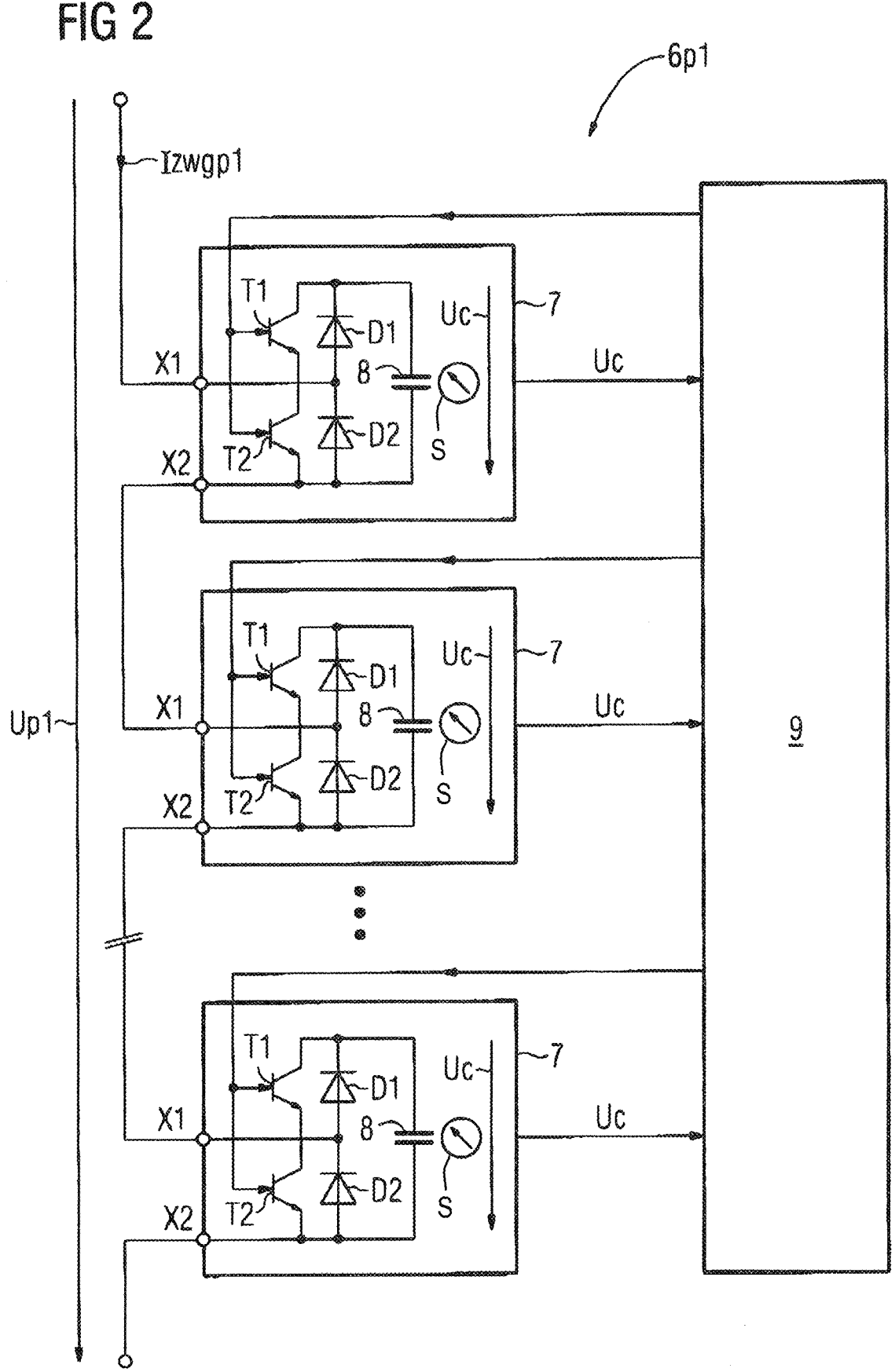

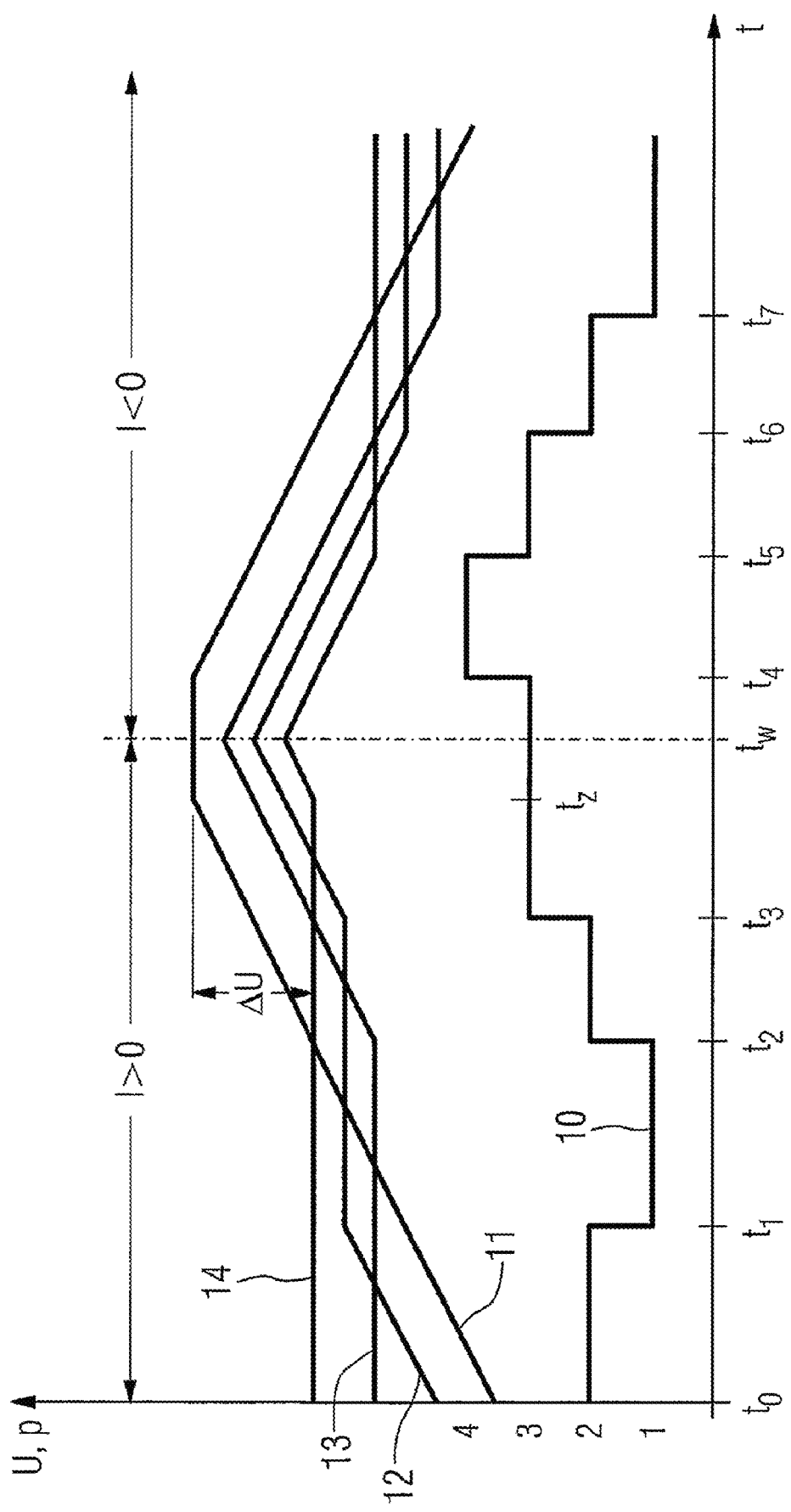

DRIVING OF A PHASE MODULE BRANCH OF A MULTILEVEL CONVERTER

BACKGROUND OF THE INVENTION

Field of the Invention

The invention relates to a method for charging and/or discharging energy storage devices of a multilevel converter comprising at least one phase module branch having a series circuit formed by submodules, which each have at least one power semiconductor circuit for turning on or off an energy storage device connected in parallel with the power semiconductor circuit and a submodule sensor for detecting an energy storage actual value, wherein with an energy change state being obtained a determination is made as to whether turned-on energy storage devices of a phase module branch can be charged or discharged, and the next energy storage device to be switched in each phase module branch is selected by means of a predetermined logic in a manner dependent on the energy change state.

Such a method is already known from a paper "New Modular Voltage Source Inverter Topology" by A. Lesnicar and R. Marquardt, which discloses a so-called multilevel converter and a method for the control thereof. A multilevel converter serves for example for the drive of an electric machine or can be used in the field of energy transmission and distribution. Thus, the use of a multilevel converter in high voltage direct current transmission has been described, wherein at least two multilevel converters are connected to one another on the DC voltage side. On the AC voltage side, each of said multilevel converters is connected to an AC voltage power supply system, thereby enabling power transmission between the AC voltage power supply systems. In this case, the multilevel converters each have phase modules, the number of which corresponds to the number of phases of the respective AC voltage power supply system. Each phase module has an AC connection and at least one DC voltage connection. Phase module branches extend between the AC voltage connection and each DC voltage connection, said phase module branches each comprising a series circuit formed by submodules. Each submodule has a power semiconductor circuit arranged in parallel with an energy storage device, such as a capacitor, for example. Depending on the switching position of the power semiconductor circuit, the voltage of the energy storage device or else the voltage zero is dropped across the bipolar connection of the submodules. The voltage dropped across the phase module branch is therefore dependent on the number of turned-on submodules. Phase module branches of the abovementioned type are also conceivable in connection with so-called "flexible AC transmission systems", wherein the latter serve as fast switches connected in series with a coil or capacitor for example for flexible power factor correction.

In accordance with said paper by Lesnicar and Marquardt, each power semiconductor circuit has two turn-off power semiconductors which are connected in series with one another and with which in each case a freewheeling diode is reverse-connected in parallel. A control unit is provided for the expedient driving of said turn-off power semiconductors. One of the tasks of the control is to hold the voltages dropped across the capacitors of the submodules at approximately the same level. An unequal voltage loading of the submodules or else of the phase module branches is avoided in this way. For balanced voltage distribution, the voltages dropped across the capacitors of a phase module branch are detected with kilohertz clock timing with energy storage actual values being obtained. Afterward, the energy storage actual values are sorted with regard to their size. If a positive current flows via the phase module branch, the energy storage devices can be charged. In this case, the energy storage device to which the smallest energy storage actual value is assigned is switched on and thus charged. If the current flowing in the respective phase module branch is negative, however, the energy storage device whose energy storage actual value is the largest is turned on, such that it can be discharged after being switched on. Firstly, the capacitors that are to be turned on and turned off are selected. Afterward, a so-called pulse width modulation performs the actual turning on and off of the selected energy storage devices. The energy storage devices are turned on and off with kilohertz clock timing, such that the voltage dropped across the sum of the turned-on submodules corresponds to a predetermined desired value on average over time. The previously known method has the disadvantage that the power semiconductors of the selected capacitors are switched with a high clock rate. This leads to a high loading of the power semiconductor circuit with frequent failures and costly maintenance work as a consequence.

BRIEF SUMMARY OF THE INVENTION

It is an object of the invention, therefore, to provide a method of the type mentioned in the introduction by means of which the energy stored in the energy storage devices of the submodules is held at approximately the same level, wherein a high clock rate when turning the selected energy storage device on and off is simultaneously avoided.

The invention achieves this object by virtue of the fact that the sum of all the turned-on energy storage actual values of a phase module branch is formed with an energy storage summation actual value being obtained, the difference between a predetermined phase module branch energy desired value and the energy storage summation actual value is determined with an energy difference value being obtained, and a switching instant at which the selected energy storage device is switched is defined if the magnitude of an energy difference value or the magnitude of a quantity derived from the energy difference value exceeds the magnitude of a switching threshold value.

According to the invention, a switching instant of the selected energy storage device is defined in accordance with a second logic. Said second logic is based on a comparison of a phase module branch energy desired value predetermined by the control or a drive unit with an energy storage summation actual value, wherein the energy storage summation actual value is the sum of the energy storage actual values of the turned-on submodules. In this case, it is assumed that only the turned-on submodules can supply a contribution for example to the voltage dropped in total across the phase module branch. Turned-off submodules, by contrast, supply no contribution to said voltage. According to the invention, the switching of the submodules is also dependent on the energy change state. The energy change state is determined for example by detecting a current flowing via the phase module branch. If the detected current is positive, turned-on energy storage devices can be charged. By contrast, the energy storage actual value of a turned-off energy storage device is not altered. In the case of a negative current flowing via the phase module branch, said current also being called a branch current, turned-on energy storage devices can, by contrast, be discharged. In a departure from the branch current detection just illustrated, the energy change state can also be determined by energy storage actual values of a turned-on energy storage device being compared with one another at two different instants. If the energy storage actual value of a temporally later measurement is greater than the energy storage actual value measured previously, the energy storage devices of the phase module branch can be charged. In the opposite case, by contrast, the turned-on energy storage devices can only be discharged. The determination of the energy change state is in any desired manner according to the invention.

The definition of an instant by means of a separate logic avoids frequent turning on and off of the selected energy storage device, as in pulse width modulation. In the context of the invention, only the next energy storage device to be switched is selected and switched at a determined switching instant. Frequent turning on and off in order to maintain an appropriate average value with respect to time has become superfluous according to the invention. Consequently, the method according to the invention provides for reduced loading of the turn-off power semiconductors.

Advantageously, the next energy storage device to be switched is that energy storage device whose energy storage actual value is the smallest or largest depending on the energy change state of an energy storage actual value of the same phase module branch. In accordance with this advantageous configuration of the invention, in the case of an energy change state in which the energy storage devices of the phase module branch can be charged, that turned-off energy storage device whose energy storage actual value is the smallest is selected for switching on. The energy storage actual value according to the present invention corresponds for example to a voltage dropped across the energy storage device or else to a square of said voltage. Ultimately, in the context of the invention, the energy storage actual value serves as a measure of the energy stored in the respectively assigned energy storage device. If the energy storage device having the smallest energy storage actual value is selected from among the turned-off energy storage devices, this means that that energy storage device in which the least energy is stored is selected.

After the selection of the energy storage device, the latter is turned on at the switching instant and thus charged. In the case of an energy change state in which the turned-on energy storage devices of the phase module branch are discharged, the energy storage device having the largest energy storage actual value is selected from among the turned-off energy storage devices for turn-on. As soon as this energy storage device is turned on at the switching instant, it is discharged, such that the energy storage actual value and hence the energy stored in the energy storage device are reduced. Upon turn-off, in the case of positive branch currents, the energy storage device having the largest energy storage actual value is selected from among the switched-on energy storage devices. In the case of negative branch currents, the energy storage device having the smallest energy storage actual value is selected for turn-off.

In accordance with one advantageous configuration of the invention, the switching threshold value is determined by multiplication of the energy storage actual value Uc of the next energy storage device to be switched by a predetermined factor, wherein the switching instant is determined if the magnitude of the energy difference value is greater than the magnitude of the switching threshold value. In accordance with this advantageous further development, the energy difference value is compared with the energy storage actual value of the next energy storage device to be switched. The energy difference value can be positive or negative. If the energy storage actual value exceeds for example half of said energy storage actual value, said energy storage device is turned on or off by means of expedient control signals to the turn-off power semiconductors of the power semiconductor circuit. If the energy difference value is negative, the energy storage device that is to be turned off next is turned off at the switching instant. If the energy difference value becomes positive, the next energy storage device to be turned on is turned on at the switching instant. After the turning on or off, the next energy storage device to be switched is selected.

Advantageously, the energy difference value is integrated over time with an energy difference integral value being obtained, wherein the switching instant is defined as the instant at which the magnitude of the energy difference integral value exceeds the magnitude of the switching threshold value. In accordance with this advantageous further development, the switching threshold value is determined by integration. Although this requires a higher computational complexity, it provides a switching instant which provides for a smaller difference between the energy storage summation actual value and semiconductor valve energy desired value.

Advantageously, the energy storage device of a phase module branch which has the largest energy storage device value is determined with a maximum energy actual value being obtained, and the energy storage device of a phase module branch which has the smallest energy storage actual value is determined with a minimum actual value being obtained, the difference between the maximum energy actual value and the minimum energy actual value is formed with a largest energy deviation actual value being formed, the largest energy deviation actual value is compared with a largest energy deviation threshold value, and an additional switching instant is defined if the largest energy deviation actual value exceeds the largest energy deviation threshold value, wherein, at the additional switching instant, in a manner dependent on the energy change state, one energy storage device is turned off and another energy storage device is turned on. This ensures that the difference between the extreme energy storage actual values within a phase module branch can only ever assume predetermined values. In this case, the circuit clock or the circuit frequency is raised no more than absolutely necessary.

In the case of a further development that is expedient in this regard, in the case of an energy change state in which the energy storage devices of a phase module branch can be charged, at the additional switching instant the energy storage device which has the largest energy storage actual value from among the energy storage devices of a phase module branch is turned off, wherein the energy storage device which has the smallest energy storage actual value from among the energy storage devices of the same phase module branch is simultaneously turned on.

In accordance with a further expedient further development, in the case of an energy change state in which the energy storage devices of a phase module branch can be discharged, at the additional switching instant the energy storage device which has the smallest energy storage actual value from among the energy storage devices of a phase module branch is turned off, wherein the energy storage device which has the largest energy storage actual value from among the energy storage devices of the same phase module branch is simultaneously turned on.

BRIEF DESCRIPTION OF THE SEVERAL VIEWS OF THE DRAWING

Further expedient configurations and advantages of the invention are the subject matter of the following description of exemplary embodiments of the invention with reference to the figure of the drawing, wherein identical reference symbols refer to identically acting structural parts, and wherein FIG. 2 shows an equivalent circuit illustration of a submodule and of a phase module branch of the multilevel converter in accordance with FIG. 1, and FIG. 3 shows a schematic illustration for elucidating an exemplary embodiment of the method according to the invention.

DESCRIPTION OF THE INVENTION

Figure 1:
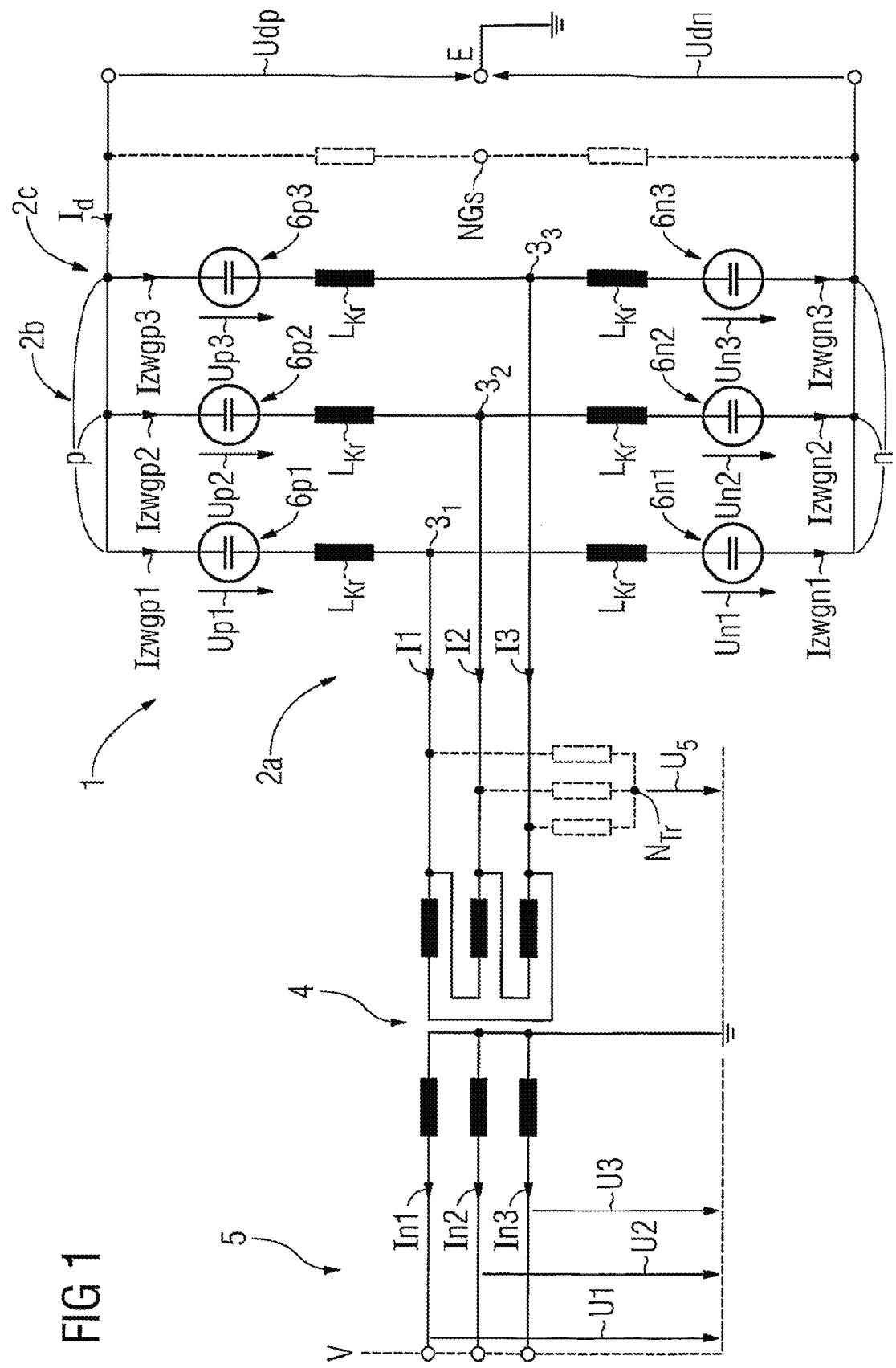
FIG. 1 shows an exemplary embodiment of a multilevel converter for carrying out the method according to the invention in a schematic illustration.

FIG. 1 shows by way of example a multilevel converter 1 composed of three phase modules 2a, 2b and 2c. Each phase module 2a, 2b and 2c is connected to a positive DC voltage line p and to a negative DC voltage line n, with the result that each phase module 2a, 2b, 2c has two DC voltage connections. Furthermore, in each case one AC voltage connection $3_1$, $3_2$ and $3_3$ is provided for each phase module 2a, 2b and 2c. The AC voltage connections $3_1$, $3_2$ and $3_3$ are connected to a three-phase AC voltage system 5 via a transformer 4. The phase voltages U1, U2 and U3 are dropped across the phases of the AC voltage system 5, with system currents In1, In2 and In3 flowing. The AC-voltage-side phase current of each phase module is designed by I1, I2 and I3. The DC voltage current is $I_d$. Phase module branches 6p1, 6p2 and 6p3 extend between each of the AC voltage connections $3_1$, $3_2$ or $3_3$ and the positive DC voltage line p. The phase module branches 6n1, 6n2 and 6n3 are formed between each AC voltage connection $3_1$, $3_2$, $3_3$ and the negative DC voltage line n. Each phase module branch 6p1, 6p2, 6p3, 6n1, 6n2 and 6n3 comprises a series circuit of submodules (not illustrated in detail in FIG. 1) and an inductance, which is designated by $L_{Kr}$ in FIG. 1.

FIG. 2 illustrates the series circuit of the submodules 7 and in particular the construction of the submodules by means of an electrical equivalent circuit diagram in more detail, with only the phase module branch 6p1 being singled out in FIG. 2. The rest of the phase module branches are constructed identically, however. It can be discerned that each submodule 7 has two turn-off power semiconductors T1 and T2 connected in series. Turn-off power semiconductors are, for example, so-called IGBTs, GTOs, I9CTs or the like. They are known as such to the person skilled in the art, and so a detailed illustration can be omitted at this juncture. A freewheeling diode D1, D2 is reverse-connected in parallel with each turn-off power semiconductor T1, T2. A capacitor 8 is connected as an energy storage device in parallel with the series circuit of the turn-off power semiconductors T1, T2 and the freewheeling diodes D1 and D2. Each capacitor 8 is charged in unipolar fashion. Two voltage states can now be generated at the two-pole connection terminals X1 and X2 of each submodule 7. If a drive unit 9 generates a drive signal, for example, by means of which the turn-off power semiconductor T2 is changed over into its on-state position, in which a current flow via the power semiconductor T2 is made possible, the voltage zero is dropped across the terminals X1, X2 of the submodule 7. In this case, the turn-off power semiconductor T1 is in its off-state position, in which a current flow via the turn-off power semiconductor T1 is interrupted. This prevents the charging or discharging of the capacitor 8. If, by contrast, the turn-off power semiconductor T1 is changed over to its on-state position, but the turn-off power semiconductor T2 is changed over to its off-state position, the full capacitor voltage Uc is present at the terminals X1, X2 of the submodule 7. The capacitor 8 can furthermore be charged or discharged depending on the direction of the branch current, that is to say in a manner dependent on the energy change state.

Each submodule furthermore has a submodule sensor S for detecting a capacitor voltage Uc dropped across the respective capacitor 8, wherein a capacitor voltage value corresponding to the capacitor voltage Uc is provided as energy storage actual value for an arbitrary superordinate control unit 9. The control unit 9 provides the control signals required for the switching of the power semiconductors T1 and T2, the exemplary embodiment of the method according to the invention as explained in greater detail below being employed.

A multilevel converter in accordance with FIGS. 1 and 2 is suitable for example for driving electric machines such as motors or the like. Furthermore, such a multilevel converter is also suitable for use in the field of energy distribution and transmission. Thus, the multilevel converter serves for example as part of a back-to-back link comprising two multilevel converters connected to one another on the DC voltage side, said converters—as shown in FIG. 1—each being connected to an AC voltage power supply system. Such back-to-back links are used for the exchange of energy between two energy distribution systems, the energy distribution systems having for example a different frequency, phase angle, neutral-point connection or the like. Furthermore, applications in the field of power factor correction as so-called FACTs (Flexible AC Transmission Systems) come into consideration. High voltage direct current transmission over long distances is also conceivable with such multilevel converters. Owing to the wealth of different application possibilities, many different operating voltages arise, to which the respective device according to the invention is to be adapted. For this reason, the number of submodules can vary from a few through to several hundred submodules 7.

FIG. 3 illustrates an exemplary embodiment of the method according to the invention with the aid of a diagram, wherein said method is carried out for example by a multilevel converter 1 in accordance with FIGS. 1 and 2. In the diagram shown in FIG. 3, time is plotted on the abscissa, while the number of energy storage devices, four in total, is plotted with 1, 2, 3, 4 in the lower region on the ordinate. It should be pointed out that each submodule 7 has an energy storage device, which is a capacitor here, wherein reference is made to the capacitors generally with the reference symbol 8. The lower curve 10 thus illustrates the number P of turned-on capacitors 8 as a function of time.

Above the curve 10, the voltage Uc respectively dropped across the four capacitors 8 is plotted as a function of time. Up to an instant designated by tw, the current Izwgp1 flowing via the phase module branch is greater than zero. This means that the capacitors 8 of the submodules 7 can each be charged up to the instant tw. In the time period following the instant tw, by contrast, the respective capacitors 8 can only be discharged if they are turned on by means of the power semiconductor circuit connected in parallel with them.

In FIG. 3, by way of example, the capacitor voltages Uc of the four capacitors 11, 12, 13 and 14 of the phase module branch 6p1 are plotted as a function of time t. At the instant tw, two capacitors, namely the capacitors 11 and 12, are turned on in accordance with the curve profile 10. Since the current I flowing via the phase module branch 6p1 is greater than zero, the voltage Uc dropped across them and thus the energy storage actual value detected by the submodule sensors rise linearly. The capacitor 12 is selected as the next capacitor to be turned off since the voltage dropped across it is greater than that of the capacitor 11. The capacitors 13 and 14 are already turned off and therefore cannot be selected as the next capacitors to be turned off. The control unit 9 has a phase module branch energy desired value that changes in time. In the time interval between t0 and t1, the phase module branch energy desired value continually becomes smaller. At the instant t1, the magnitude of the difference between the phase module branch energy desired value and an energy storage summation actual value, which is formed from the sum of the capacitor voltages Uc of the capacitors 11 and 12, is less than half of the capacitor voltage of the next capacitor 12 to be turned off, with the result that a switching instant is defined at which the capacitor 12 is turned off. Now only the capacitor 11 is turned on. The voltage profile of the capacitors 12, 13 and 14 has the gradient zero. The capacitors 12, 13 and 14 are no longer charged.

The temporal profile of the phase module branch desired value is sinusoidal. In the time interval between t1 and t2, the semiconductor energy desired value reaches its minimum and subsequently rises again. In order to follow this predetermined curve profile, previously turned-off capacitors have to be turned on by the control unit. The branch current Izwg1 is positive. The capacitor 13 is therefore selected as the next capacitor to be turned on, across which capacitor 13 the least voltage is dropped, such that said capacitor 13 can be charged and attains the voltage level of the other capacitors. At the switching instant t2, the magnitude of the difference between phase module branch energy desired value and energy storage summation actual value, which in this case is equal to the capacitor voltage Uc of the single turned-on capacitor 11, is greater than the magnitude of the switching threshold value, which is again formed from the multiplication of the capacitor voltage of the capacitor to be switched—here capacitor 13—by the factor ½. The capacitors 11 and 13 are now charged.

The capacitor voltage of the capacitor 13 finally exceeds the capacitor voltage of the capacitor 12, with the result that the capacitor 12 is selected as the next capacitor to be turned on. The sum of the capacitor voltages of the capacitors 11 and 13 is now the energy storage summation actual value. At the switching instant t3, the magnitude of the difference between phase module branch energy desired value and energy storage summation actual value, that is to say the sum of the capacitor voltages of the capacitors 11 and 13, is greater than half of the capacitor voltage dropped across the capacitor 12, with the result that now the capacitor 12 is also turned on.

At the additional switching instant tz, the voltage difference ΔU between the smallest capacitor voltage, which is dropped across the capacitor 14, and the largest capacitor voltage, which is dropped across the capacitor 11, is greater than a largest energy deviation threshold value predetermined by the control unit. For this reason, the control unit 9 turns off the capacitor 11, across which the largest capacitor voltage Uc is dropped, and at the same instant turns on the capacitor 14, across which the smallest capacitor voltage is dropped at the instant tz. This measure ensures that the capacitor voltages Uc of the capacitors of a phase module branch do not assume greatly different values. This would result in unequal voltage loading and thus damage to the submodules 7.

At the instant tw, the branch current flowing via the phase module branch, which branch current is designated just by I for reasons of clarity in FIG. 3, becomes negative. The turned-on capacitors 12, 13 and 14 are therefore discharged. The single turned-off capacitor 11 is necessarily selected as the next capacitor to be turned on. At the instant t4, the difference between semiconductor energy desired value and energy storage summation actual value, which is formed from the sum of the capacitor voltages dropped across the capacitors 12, 13 and 14, is greater than half of the capacitor voltage Uc of the capacitor 11, with the result that the capacitor 11 is turned on. All the capacitors are now discharged.

In the time interval between t4 and t5, the predetermined phase module branch energy desired value passes through a maximum and subsequently becomes smaller again, with the result that capacitors 8 from the series circuit of the submodules 7 of the phase module branch 6p1 have to be turned off. The capacitor 14 is selected as the next capacitor to be turned off since the smallest voltage is dropped across said capacitor 14 and hence the lowest energy is stored in said capacitor 14. The control now provides for a decreasing semiconductor energy desired value. At the instant t5, the difference between semiconductor energy desired value and energy storage summation value is negative and less than a negative energy difference value. The capacitor 14 is turned off. The corresponding procedure is adopted with respect to the switching instants t6 and t7.

The invention claimed is:

1. A method for charging and/or discharging energy storage devices of a multilevel converter including at least one phase module branch with a series circuit of submodules each having at least one power semiconductor circuit for turning on or off an energy storage device connected in parallel with the power semiconductor circuit and a submodule sensor for detecting an energy storage actual value, the method comprising the following steps:
   upon obtaining an energy change state, determining if turned-on energy storage devices of a phase module branch can be charged or discharged;
   selecting the next energy storage device to be switched in each phase module branch with a predetermined logic in dependence on the energy change state;
   forming a sum of all turned-on energy storage actual values to obtain an energy storage summation actual value;
   determining a difference between a predetermined phase module branch energy desired value and the energy storage summation actual value to obtain an energy difference value; and
   defining a switching instant of the selected energy storage device if a magnitude of the energy difference value or a magnitude of a quantity derived from the energy difference value exceeds a magnitude of a switching threshold value.

2. The method according to claim 1, which further comprises determining the next energy storage device to be switched as that energy storage device having an energy storage actual value being the smallest or largest depending on the energy change state of all the energy storage actual values of the same phase module branch.

3. The method according to claim 1, which further comprises determining the switching threshold value by multiplication of the energy storage actual value of the next energy storage device to be switched by a predetermined factor, and determining the switching instant if the magnitude of the energy difference value is greater than the magnitude of the switching threshold value.

4. The method according to claim 1, which further comprises integrating the energy difference value over time to obtain an energy difference integral value, and defining the switching instant as an instant at which the energy difference integral value exceeds a positive switching threshold value or falls below a negative switching threshold value depending on the energy change state.

5. The method according to claim 1, which further comprises:

determining the energy storage device of a phase module branch having the largest energy storage actual value to obtain a maximum energy actual value;

determining the energy storage device of a phase module branch having the smallest energy storage actual value to obtain a minimum energy actual value;

forming a difference between the maximum energy actual value and the minimum energy actual value to form a largest energy deviation actual value;

comparing the largest energy deviation actual value with a largest energy deviation threshold value;

defining an additional switching instant if the largest energy deviation actual value exceeds the largest energy threshold value; and turning off one energy storage device and turning on another energy storage device at the additional switching instant in dependence on the energy change state.

6. The method according to claim 5, which further comprises:

in the case of an energy change state in which the energy storage devices of a phase module branch can be charged, at the additional switching instant:

turning off the energy storage device having the largest energy storage actual value from among the energy storage devices of a phase module branch, and simultaneously turning on the energy storage device having the smallest energy storage actual value from among the energy storage devices of the same phase module branch.

7. The method according to claim 5, which further comprises:

in the case of an energy change state in which the energy storage devices of a phase module branch can be discharged, at the additional switching instant:

turning off the energy storage device having the smallest energy storage actual value from among the energy storage devices of a phase module branch, and simultaneously turning on the energy storage device having the largest energy storage actual value from among the energy storage devices of the same phase module branch.

* * * * *